Figure 1:
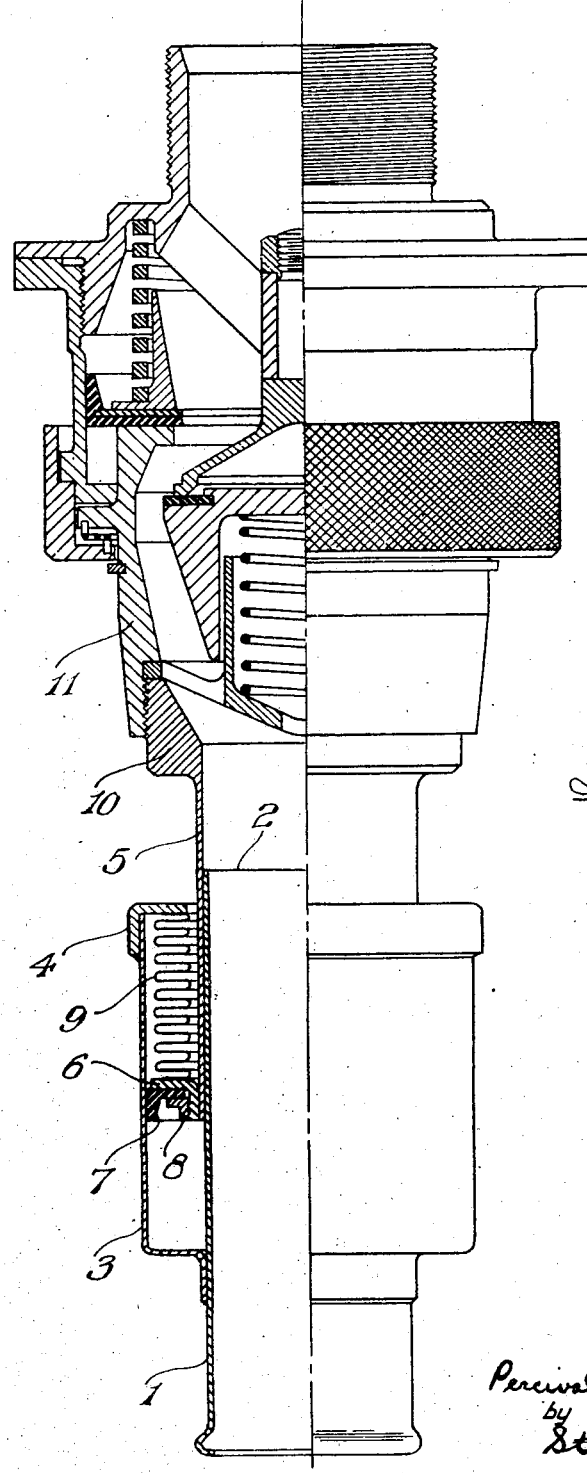

July 19, 1949.  P. E. THOMAS  2,476,929
TELESCOPIC PIPE JOINT OR COUPLING
Filed Dec. 3, 1945  2 Sheets-Sheet 1

Inventor
Percival Edward Thomas
by
Stevens and Davis
his Attorneys

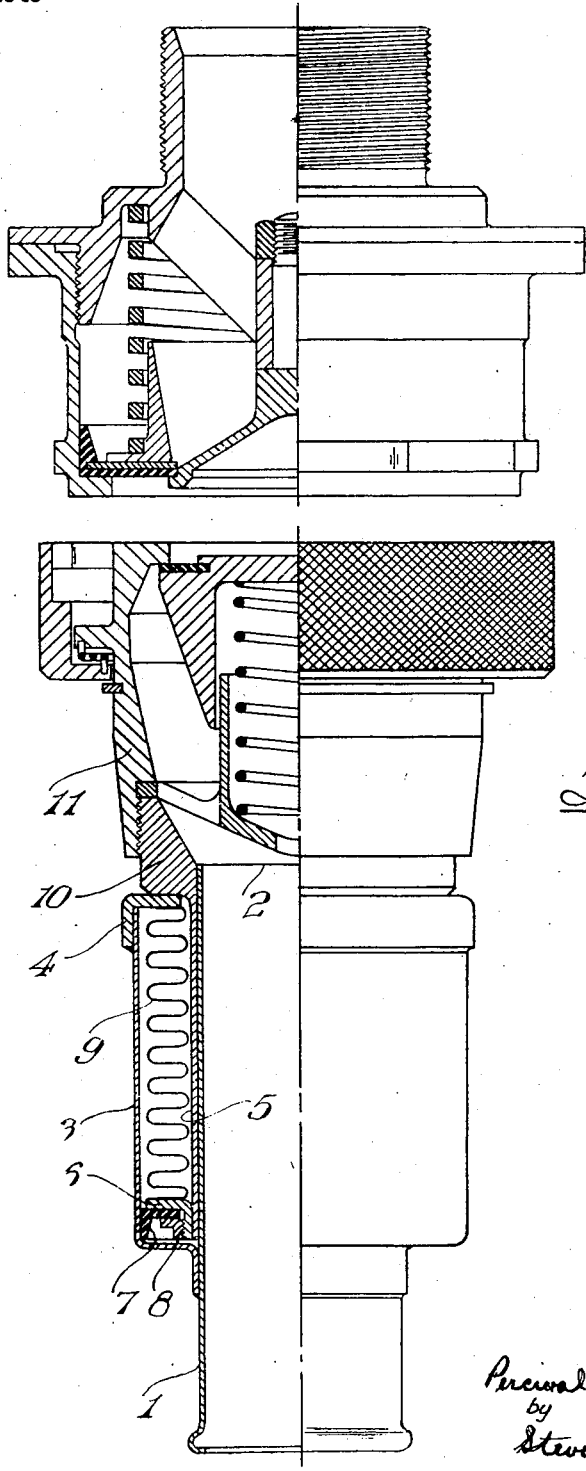

Patented July 19, 1949

2,476,929

UNITED STATES PATENT OFFICE 2,476,929

TELESCOPIC PIPE JOINT OR COUPLING

Percival Edward Thomas, Worcester Park, England, assignor to Sterling Industries Limited, London, England, a British company Application December 3, 1945, Serial No. 632,431
In Great Britain December 6, 1944

5 Claims. (Cl. 285—162)

This invention relates to improvements in telescopic pipe joints or couplings and has for its object means to provide a continuous fluid tight conduit capable of axial length decrease on uncoupling with increase of such decreased length on recoupling.

The invention is substantially applicable to any type of pipe, whether flange connected, union socketed or fitted with self sealing devices, further it is capable of being constructed to deal with both high and low working pressures.

The invention, however, finds particularly useful application in the conduits employed for remote hydraulic controls, such as are employed on aircraft, modern watercraft and the like, wherein replacement or repair of damaged parts, power units and controls have to be effected within the minimum of time, and the fluid conduits not only disconnected but when so uncoupled leave space for easy removal of the adjoining part and ancillary connections.

The conduits on hydraulic controls have frequently to withstand considerable pressures, and for such reason are of stiff section or made from alloy metals that possess innate rigidity and once bent or curved to their given set, resist deformation to give access to their coupling parts on disconnection. Hence on taking down an aircraft engine a considerable time may be occupied in uncoupling and bending away hydraulic control conduits despite the fact that such dismantling is effected by the maximum labour force that can be advantageously employed.

The present invention obviates the above difficulties and consists in a telescopic joint for pipe coupling joints wherein the pipe extremity proper has an applied telescopically slidable extension coupler part, said pipe extremity having an annular cylinder adapted to receive an annular piston, the latter formed with or attached to said telescopic coupler part, with resilient means tending to move said coupler part away from its opposed coupling member upon uncoupling.

According to the invention the resilient device tending to move said piston on uncoupling is constituted as a metallic expansible bellows device taking an abutment between an annular cylinder cover and the face of the annular piston.

The device is so arranged that when uncoupling takes place a flange part pertinent to the mobile telescopic extension coupler part is adapted to bear upon the outer face of the annular cylinder cover.

The piston pipe coupler part is or may be the detachable entity of a screw or cramp pipe coupling, and equally be provided with or form part of a self sealing valve, the arrangement being characterised that on coupling the resilient bellows is compressed and partially collapsed within the outer annular cylinder, the cup packing preventing any fluid escape, and the piston coupler part moves outward from its fully telescoped condition within the cylinder, but on uncoupling is capable of return to a fully telescoped condition within the annular cylinder, leaving ample clearance room from the fixed coupler part when wholly disconnected.

It is obvious that within the ambit of the invention, the device requires or assumes constructions that must vary according to the pressures employed and the degree of telescopic movement necessary. It is, however, practical to limit the external diameter of the parts to those pertinent to an ordinary self sealing pipe coupling and in many cases to be considerably less.

In order that the invention shall be more fully understood, reference is made to the accompanying drawings wherein:

Fig. 1 shows the invention as applied to a self sealing pipe coupling in part section elevation, the device being shown in its coupled condition, Fig. 2 is a like view as to Fig. 1, but the device is shown in an uncoupled condition.

Referring to the drawings the pipe 1, constituting the fluid conduit, terminates as such at 2. At a point below its termination an outer annular cylinder 3 is secured upon its length, said cylinder being provided with a cover 4. A telescopically mobile extension pipe 5 is fitted over the pipe 1, said pipe 5 carrying an annular shaped piston 6 at its lower extremity. A cup packing 7 is provided to give a fluid tight joint against the inner wall of the cylinder 3, said packing being supported by, and locked into, position with a threaded flanged annular collar ring 8.

Disposed above piston 6 is a resilient bellows member 9 the lower end of which, as shown, is secured to the crown of the piston 6 and the end of the bellows remote therefrom takes a bearing upon the cylinder cover 4, and may if required be fixedly secured thereto. The extension pipe 5 carries at its outer end a coupling part 10 for attachment, in the form illustrated, to a self sealing pipe coupling 11. The coupling part 10 may of course constitute one connector part for any type of coupling or pipe union whether it be of the flange, spigot and socket, or other type since the extension coupler pipe 5 and its piston parts can if required be capable of rotary motion as well as telescopic motion about the pipe 1.

The operation of the invention is as follows:

The extension pipe 5 operates as a tubular piston rod and is mobile under the influence of the resilient member 9 engaging its piston part 6 and in the uncoupled state as shown in Fig. 2 the piston 6 is urged by the resilient member 9 to descend to the limit of its stroke at which point the coupling part 10 rests upon the cover 4 of the annular cylinder 3.

When the invention is used in connection with self sealing pipe couplings as shown in Figs. 1 and 2 it is essential that no fluid loss occurs and for such reason the piston is packed at 7 to form a fluid tight joint whilst leaving the extension pipe 5 free to move about its longitudinal axis on coupling. If the coupler part 10 does not require to be rotated then the bellows device 9 is secured at the base to the piston 6 and at its end remote therefrom to the cylinder cover 4 in which form the bellows device provides an additional fluid seal against egress of fluid past the piston packing 7.

Having now particularly described and ascertained the nature of my said invention, and in what manner the same is to be performed, I declare that what I claim is:

1. In a pipe coupling assembly of the type including interengaging elements defining a passageway and means for locking said elements against relative movement, the improvement that comprises a cylindrical extension of one of said elements, a pipe upon which said extension is telescopically mounted for movement from an extended position to a retracted position, said pipe entering said extension from the end opposite to the interengaging element, an annular piston secured to said extension, an annular cylinder adapted to receive said piston and attached to said pipe, and a resilient member tensioned between said piston and said cylinder and biasing said extension to its retracted position whereby when said locking means is released said one interengaging element is moved away from the other of said elements.

2. In a pipe coupling assembly of the type including interengaging elements defining a passageway and means for locking said elements against relative movement, the improvement that comprises a cylindrical extension of one of said elements, a pipe upon which said extension is telescopically mounted for movement from an extended position to a retracted position, said pipe entering said extension from the end opposite to the interengaging element, an annular piston secured to said extension, an annular cylinder adapted to receive said piston and attached to said pipe, a cover for said annular cylinder, and a hollow resilient member tensioned between the crown of said piston and said cover of said annular cylinder and biasing said extension to its retracted position whereby when said locking means is released said one interengaging element is moved away from the other of said elements.

3. In a pipe coupling assembly of the type including interengaging elements defining a passageway and means for locking said elements against relative movement, the improvement that comprises a cylindrical extension of one of said elements, a pipe upon which said extension is telescopically mounted for movement from an extended position to a retracted position, said pipe entering said extension from the end opposite to the interengaging element, an annular piston secured to said extension, an annular cylinder adapted to receive said piston and attached to said pipe, a cover for said annular cylinder, and a hollow imperforate resilient member attached at one end to said cover and at the other end to said piston and said resilient member being tensioned between said piston and said cover and biasing said extension to its retracted position whereby when said locking means is released said one interengaging element is moved away from the other of said elements.

4. In a pipe coupling assembly of the type including interengaging elements defining a passageway and means for locking said elements against relative movement, the improvement that comprises a cylindrical extension of one of said elements, an annular pipe upon which said extension is rotatably telescopically mounted for movement from an extended position to a retracted position, said pipe entering said extension from the end opposite to the interengaging element, an annular piston secured to said extension, an annular cylinder adapted to receive said piston and attached to said pipe, a cup packing secured to said piston adjacent the inner surface of said cylinder, and a resilient member tensioned between said piston and said cylinder and biasing said extension to its retracted position whereby when said locking means is released said one interengaging element is moved away from the other of said elements.

5. In a pipe coupling assembly of the type including interengaging elements defining a passageway and means for locking said elements against relative movement, the improvement that comprises a cylindrical extension of one of said elements, a pipe upon which said extension is telescopically mounted for movement from an extended position to a retracted position, said pipe entering said extension from the end opposite to the interengaging element, an annular piston secured to said extension, an annular cylinder adapted to receive said piston and attached to said pipe, a cover for said cylinder, a resilient member tensioned between said piston and said cover and biasing said extension to its retracted position whereby when said locking means is released said one interengaging element is moved away from the other of said elements, and means carried by said extension and coacting with said cover to limit the magnitude of retraction of said extension under the influence of said resilient member.

PERCIVAL EDWARD THOMAS.

REFERENCES CITED

The following references are of record in the file of this patent:

UNITED STATES PATENTS

| Number | Name | Date |
| --- | --- | --- |
| 327,281 | Letzkus | Sept. 29, 1885 |
| 1,796,415 | Tyler | Mar. 17, 1931 |
| 1,893,434 | Muller | Jan. 3, 1933 |